United States Patent
Suzuki et al.

(10) Patent No.: US 7,472,425 B2
(45) Date of Patent: Dec. 30, 2008

(54) INFORMATION PROVIDING SYSTEM AND AUTHENTICATION MEDIUM ACCESS CONTROL METHOD AND COMPUTER PROGRAM

(75) Inventors: Mitsushige Suzuki, Kanagawa (JP); Junichi Sato, Tokyo (JP); Takashi Matsuo, Tokyo (JP)

(73) Assignee: Sony Corporation, Tokyo (JP)

( * ) Notice: Subject to any disclaimer, the term of this patent is extended or adjusted under 35 U.S.C. 154(b) by 346 days.

(21) Appl. No.: 10/489,701

(22) PCT Filed: Apr. 4, 2003

(86) PCT No.: PCT/JP03/04321

§ 371 (c)(1),
(2), (4) Date: Oct. 27, 2004

(87) PCT Pub. No.: WO03/098542

PCT Pub. Date: Nov. 27, 2003

(65) Prior Publication Data

US 2005/0055452 A1 Mar. 10, 2005

(30) Foreign Application Priority Data

May 21, 2002 (JP) ............................ 2002-146078

(51) Int. Cl.
*G06F 7/04* (2006.01)
*G06F 17/30* (2006.01)
*H04L 9/00* (2006.01)

(52) U.S. Cl. ..................... 726/30; 726/2; 726/3; 726/4; 726/5; 726/6; 713/189; 713/190; 713/191; 713/192; 713/193; 713/182; 713/183; 713/184; 713/185; 713/186

(58) Field of Classification Search .................... 726/30
See application file for complete search history.

(56) References Cited

U.S. PATENT DOCUMENTS 7,043,643 B1 * 5/2006 Doe et al. ................... 713/189
2001/0040511 A1 * 11/2001 Bushner et al. ......... 340/825.27

FOREIGN PATENT DOCUMENTS

JP         2002-63516     *  2/2002

* cited by examiner

*Primary Examiner*—Longbit Chai
(74) *Attorney, Agent, or Firm*—Oblon, Spivak, McClelland, Maier & Neustadt, P.C.

(57) ABSTRACT

A service provider makes requests to an information processing center for processing for an IC card in card command units. The information processing center issues encrypted card commands that can be interpreted by the IC card itself based on requests received from the service provider and sends these to the IC card via the computer network, client, and card reader/writer device. This enables an IC card connected to a client to be accessed using secure communication.

15 Claims, 8 Drawing Sheets

INFORMATION PROVIDING SYSTEM AND AUTHENTICATION MEDIUM ACCESS CONTROL METHOD AND COMPUTER PROGRAM

TECHNICAL FIELD

The present invention relates to an access control method and a computer program for an information providing system and authentication medium for providing information services over wide area networks such as the Internet, and particularly relates to an access control method and a computer program for an information providing system and authentication medium for carrying out processing such as authentication procedures and electronic settlement using secure communication via a wide area network.

More specifically, the present invention relates to an access control method and computer program for an information providing system and authentication medium for providing services via the wide area network to a client to which an IC card holding value information and authentication information is connected, and particularly relates to an access control method and computer program for an information providing system and authentication medium for accessing an IC card connected to a client using secure communication.

BACKGROUND ART

Conventionally, various devices employing personal identification numbers and passwords in order to perform processing to verify and authenticate a person have been proposed and put into practical use. For example, with a bank or other financial institution, a user is prompted to input a personal identification number and password as means of personal authentication when using a cash dispenser or other financial terminal when using a cash card or credit card. An operation of depositing or withdrawing money is then carried out after verifying that a user has inputted a correct personal identification number and password.

Only a storage region that is only capable of being used by this bank is provided in a recording medium such as a magnetic stripe provided on a single cash card. The aforementioned inputting of personal identification numbers or passwords can therefore not exceed accessing of this single storage region, and it is difficult to say that protection with respect to falsification and misappropriation is sufficient.

As a result, IC cards equipped with memory functions such as contact-type IC cards having electrical contacts provided at cash cards and credit cards etc. and non-contact IC cards for reading and writing data via wireless data without making contact have also come to be used from the viewpoint of prevention of falsification, etc. For example, an IC card reader/writer installed at a cash dispenser, concert hall entrance or ticket gate of a station etc. can access an IC card held up by a user in a non-contact manner.

The user inputs a personal identification number into the IC card reader, and personal verification or authentication processing is carried out between the IC card and the IC card reader/writer by collating the inputted personal identification number and a personal identification number stored in the IC card. (The personal identification number used during IC card access is particularly referred to as a PIN (Personal Identification Number).) Utilization of, for example, an application stored in the IC card is then possible when the personal verification or authentication processing is successful.

Here, it can be cited that the value information such as for electronic money or electronic tickets is possible as the application held on the IC card. Electronic money and electronic tickets are indicated as a system of settlements (electronic settlements) via electronic data issued in accordance with funds provided by a user or as an electronic data itself.

Recently, IC cards having comparatively large capacity storage space have appeared and are becoming widespread as the micro fabrication technology improves. Conventional cash cards etc. only have a single storage region, i.e. a single application. It is therefore necessary to carry around a plurality of cards corresponding to each application or purpose. On the contrary, according to an IC card with this kind of large memory capacity, it is possible to store a plurality of applications at the same time so that a single card can be utilized in a plurality of applications. It is therefore possible to utilize a single IC card for various applications by, for example, storing two or more applications such as for electronic money for carrying out electronic settlements or electronic tickets for entering a specific concert hall on a single IC card.

Further, by providing a wired interface for connecting with other equipment in addition to a wireless non-contact interface for connecting an IC card with a card reader/writer (card read/write device), it is possible to use the IC card built-into information processing terminals such as mobile telephones, PDAs (Personal Digital Assistants), or personal computers etc., or use the IC card through connection via an external interface. For example, an IC card of a user can be connected by increasing the number of card read/write devices of a personal computer, etc.

In this case, various application services utilizing the IC card can be executed using an information processing terminal. For example, interaction of a user with an IC card by employing a user interface such as a keyboard or display etc. of an information processing terminal can be carried out on the information processing terminal.

In the case where an IC card is connected to an information processing terminal connected to an information search space such as, for example, the Internet, a user can search WWW information space via a Web browser activated using an information processing terminal and download (i.e. write to the IC card) content discovered at that time to the IC card, or conversely, a user can upload (i.e. read from the IC card) content held in an IC card to a location found in the WWW information space.

Further, fees for fee-based services (viewing of fee-based content or on-line shopping for merchandise) enjoyed in the WWW information space can be settled using electronic money held in the IC card. Electronic money referred to in this case is indicated as a system of settlements (electronic settlements) via electronic data issued in accordance with funds provided by a user or as an electronic data itself. Alternatively, a point service corresponding to purchased merchandise can be written to the IC card.

However, in order to carry out secure communication via a computer network such as the Internet etc. and exchange data with IC cards, it is necessary to incur substantial costs. The reason for this is that in addition to a dedicated device for issuing commands that an IC card can interpret being necessary, it is necessary to manage passwords and encryption keys for users of each IC card for cryptocommunication, and it is necessary to introduce strong, tamper resistance equipment to physically protect secret information.

This substantial cost load provides a large barrier with respect to the propagation of convenient services utilizing IC cards and the expansion of related businesses.

DISCLOSURE OF THE INVENTION

It is therefore the object of the present invention to provide a superior access control method and computer program for information providing systems and authentication media capable of carrying out processing such as authentication procedures and electronic settlement using secure communication via a wide area network.

It is a further object of the present invention to provide a superior access control method and computer program for information providing systems and authentication media capable of appropriately providing services via a wide area network to a client to which an IC card holding value information and authentication information is connected.

It is a still further object of the present invention to provide a superior access control method and computer program for information providing systems and authentication media capable of accessing an IC card connected to a client using secure communication.

In order to take into consideration the aforementioned problems, in a first aspect of the present invention, an information providing system for providing information to a client in possession of an authentication medium capable of being accessed using key information via a communication medium, is characterized by:

an information providing device for performing information providing services for the client via the communication medium;

an authentication medium access device for executing accessing processing accompanying information providing services for the authentication medium possessed by the client via the communication medium in response to information providing services performed by the information providing device; and a connection device for handing over key information for accessing the authentication medium in advance between the information providing device and the authentication medium access device.

However, "system" referred to in this case refers to where a plurality of devices (or function modules implementing specific functions) are collected together in a logical manner, and there is no particular preference as to whether or not each device or function module is within a single housing.

Further, in a second aspect of the present invention, a method for controlling access to an authentication medium in order to provide information to a client in possession of an authentication medium capable of being accessed using key information via a communication medium is characterized by:

a key information receiving step of receiving key information for accessing the authentication medium in advance from an information providing device; and an authentication medium access step for executing accessing processing accompanying information providing services for the authentication medium possessed by the client via the communication medium in response to information providing services carried out by the information providing device for the client via the communication medium.

Here, an authentication medium is an IC card, which holds electronic money and other value information, and for which access is permitted via, for example, personal verification or authentication processing.

According to the present invention, a client utilizing information providing services via the communication medium can make settlements for usage fees for information providing services utilizing electronic money held on the IC card, or can perform management so as to write points for a point service corresponding to a settlement fee to the IC card.

In this case, substantial costs are incurred in order to carry out secure communication via the communication medium and in order to exchange data with the IC card. The reason for this is that in addition to a dedicated device for issuing commands that an IC card can interpret being necessary, it is necessary to manage passwords and encryption keys for users of each IC card for cryptocommunication, and it is necessary to introduce strong, tamper resistance equipment to physically guarantee secret information.

According to the information providing system and the method for controlling access to an authentication medium of the first and second aspects of the present invention, an authentication medium access device for executing access operations to an authentication medium such as an IC card in the possession of a client can be located other than the information providing server on a communication medium. It is therefore not necessary for the information providing device itself to install the communication medium in the authentication medium and this function can be entrusted to the authentication medium access device.

As a result, as the function of accessing the authentication medium is entrusted to the authentication medium access device, the information providing device is liberated from the considerable trouble and costs required to install and maintain this function.

Here, the authentication medium access device or step carries out verification of the authentication medium, authentication processing of the authentication medium, and/or reading and writing processing of electronic data stored in the authentication medium.

Further, the key information required to access the authentication medium can be received utilizing a secure communication path established on the communication medium, or can be received via a dedicated line.

Further, the operation of accessing to the authentication medium access device may also be achieved by carrying out access operations to the authentication medium in response to requests from the information providing device and sequentially returning the access results to the information providing device.

Alternatively, it may be carried out verification of the authentication medium, authentication processing for the authentication medium and/or read/write processing of electronic data stored in the authentication medium, in response to requests from the information providing device, and may be reported results of a series of access processes for the authentication medium to the information providing device.

Further, in a third aspect of the present invention, a computer program described in computer-readable format for executing control of accessing an authentication medium accessible using an information key via a communication medium on a computer system, is characterized by:

a key information receiving step of receiving key information for accessing the authentication medium in advance from an information providing device; and an authentication medium access step for executing accessing processing accompanying information providing services for the authentication medium possessed by the client via the communication medium in response to information providing services carried out by the information providing device for the client via the communication medium.

The computer program of the third aspect of the present invention is that defining a computer program described in a computer-readable format for implementing prescribed processing on a computer system. In other words, by installing the computer program of the third aspect of the present invention on a computer system, cooperative actions are demonstrated on the computer system, and the same operation results can be obtained as for the method for controlling access to an authentication medium of the second aspect of the present invention.

Still further other objects, features, and advantages of the present invention will become clear as a result of a more detailed description given below based on embodiments of the present invention and the attached drawings.

BEST MODE FOR CARRYING OUT THE INVENTION

The following is a detailed description with reference to the drawings of the embodiments of the present invention.

Figure 1:
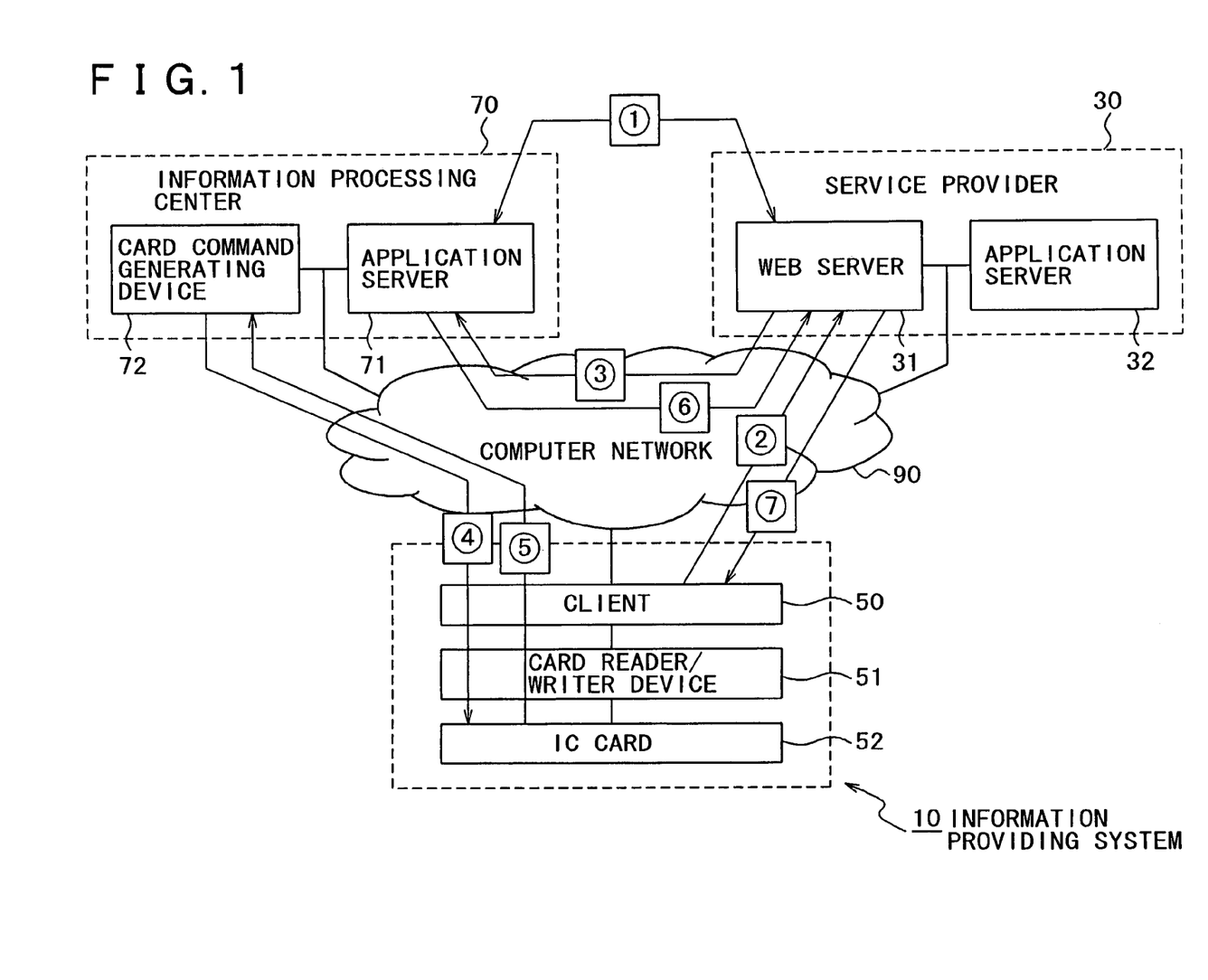
FIG. 1 is a view schematically showing an application example of an information providing system 10 of a first embodiment of the present invention.

A view schematically showing an application example of an information providing system 10 of a first embodiment of the present invention is shown in FIG. 1.

As shown in the same drawing, the information providing system 10 is configured from a service provider 30 for carrying out information services, a client 50 requesting services from the service provider 30, and an information processing center 70 for communicating with an IC card 52 installed on the side of the client 50 via a network 90. These three are mutually connected via a computer network (the Internet, etc) 90 based on a prescribed protocol such as, for example, TCP/IP. In order to keep the drawings simple, only one of each service provider and client is depicted but it may be also possible for a limitless number of providers and clients to exist on the network 90.

The service provider 30, for example, activates the WWW server, responds to HTTP requests from the client 50, and provides services in the form of HTTP responses. The information content may be provided in a fee-based manner or may be carried out as merchandise sales (net sales) etc.

The client 50 is a personal computer (PC) 51 activating a client application such as, for example, a WWW browser, and may be arranged at home or in an office. The client 50 issues HTTP requests and makes various service requests to the service provider 30 such as for content providing and merchandise purchasing, etc.

An IC card 52 having a memory function is connected to the client 50. In the example shown in the drawing, a card reader/writer device 51 is added to the client 50, and is connected to the client 50 via non-contact communication based on theory of electromagnetic induction action between the card reader/writer device 52 and the IC card 53. The card reader/writer device 51 is connected to the client 50 via, for example, a USB (Universal Serial Bus) or other I/O interface. However, the form of connection between the client 50 and the IC card 52 is not particularly limited, and, for example, the card 52 may be built-into the client 50 (in this case, the card reader/writer device 51 is no longer necessary).

Value information such as, for example, electronic money is held within the IC card 52. When the client 50 is enjoying fee-based services from a service provider 30 via the computer network 90, immediate settlement is possible utilizing electronic money on the IC card 52. Alternatively, it is also possible to write a point service accrued by paying a fee utilizing fee-based services such a merchandise purchasing to the IC card 52.

On the other hand, a great deal of expense is necessary in order to carry out secure communication via the computer network 90 and exchange data with the IC card 52. The reason for this is that in addition to a dedicated device for issuing commands that an IC card 52 can interpret being necessary, it is necessary to manage passwords and encryption keys for users of each IC card for cryptocommunication, and it is necessary to introduce strong, tamper resistance equipment to physically protect secret information.

Of course, the service provider 30 itself may be installed with a function for communicating with the IC card 52 via the computer network 90, but this embodiment adopts a configuration where the information processing center 70 is entrusted with this function.

The information processing center 70 is comprised of an application server 71 and a card command generating device 72. The application server 71 works in unison with the client 50 connected via a TCP/IP network and establishes communication with the IC card 53 connected to the card reader/ writer device 51. The card command generating device 72 issues commands the IC card 53 is capable of interpreting.

In this embodiment, the service provider 30 sequentially instructs the information processing center 70 of all of the procedures for the IC card 52. In other words, the information processing center 70 carries out access operations to the IC card 52 according to sequential requests from the service provider 30 and sequentially replies with access results.

The kind of network operation shown below is executed by the information providing system 10 shown in FIG. 1.

(1) The service provider 30 makes requests to the information processing center 70 for processing for the IC card 52 in card command units. During this time, communication is carried out between the service provider 30 and the information processing center 70 in a state guaranteeing security including the use of a key when reading and writing to and from the IC card 53.

(2) The information processing center 70 issues encrypted card commands that can be interpreted by the IC card itself based on requests received from the service provider 30 and sends these to the IC card 53 via the computer network, client 51, and card reader/writer device 52.

(3) The IC card 53 translates card commands for which encryption is complete received from the information processing center 70, carries out processing within the card, and sends responses (processing results) to the encrypted card commands to the information processing center 70 via the card reader/writer device 52, client terminal 51, and computer network 90.

(4) The information processing center 70 deciphers responses for which encryption is complete received from the IC card 53 and replies to instructions from the service provider 30.

(5) The service provider 30 then carries out subsequent processing based on replies from the information processing center 70.

Therefore, by entrusting the function of accessing the IC card to the information processing center 70, the service provider 30 is liberated from the considerable trouble and costs required to install and maintain this function.

This information providing system 10 executes an on-line purchasing procedure for between the client 50 and the service provider 30 using the processing procedure shown below.

① A key is handed over beforehand between the service provider 30 and the information processing center 70

② Trigger to the service provider 30 occurring at the client 50 (example, pressing of a purchase button on a browser screen)

③ Instruction from the service provider 30 to the information processing center 70

④ Issuing of command from the information processing center 70 to the IC card 52

⑤ Response from the IC card 52 to the information processing center 70

⑥ Reply to instruction from information processing center 70 to the service provider 30

⑦ Response to trigger from the service provider 30 to the client 50

Figure 2:
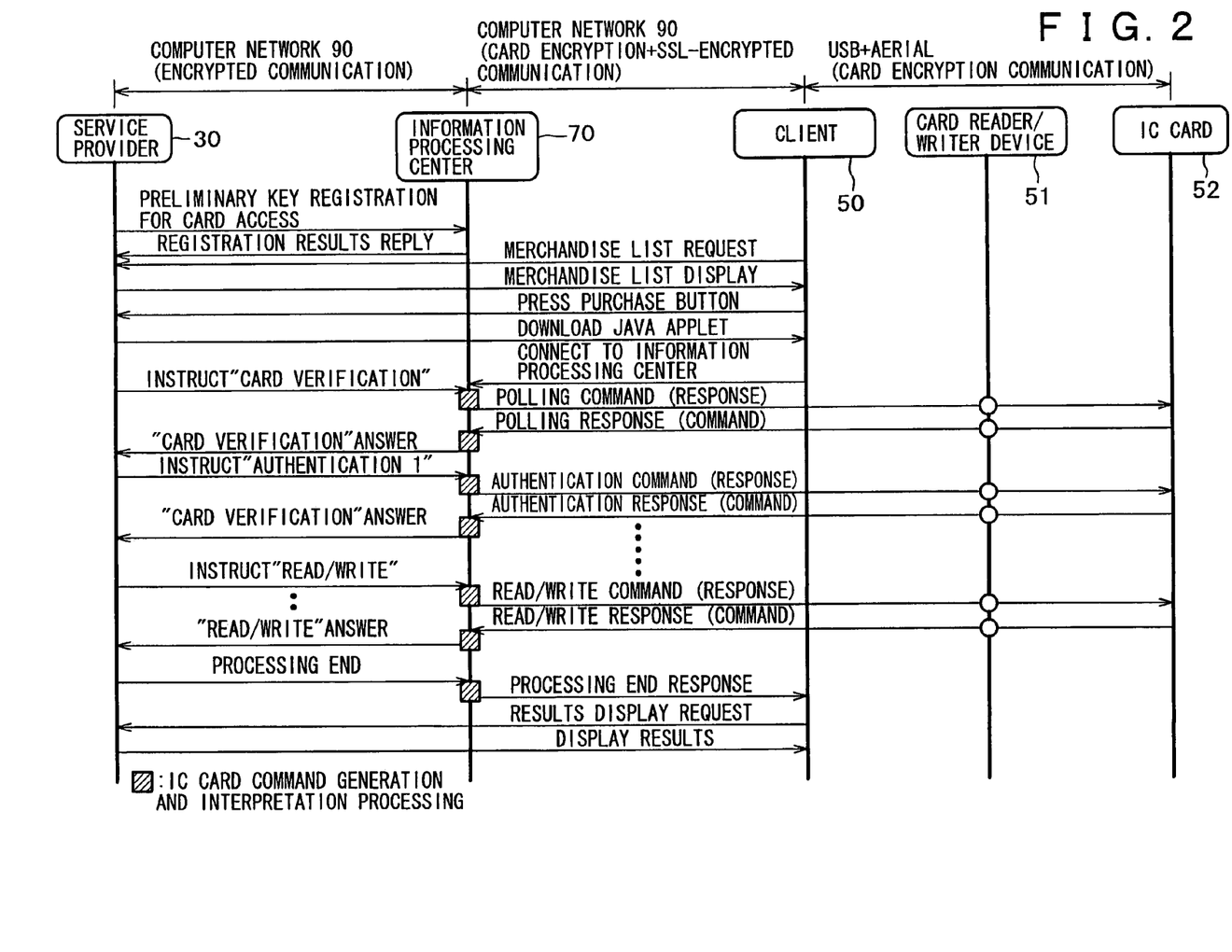
FIG. 2 is a view showing a sequence for enabling a client 50 to utilize on-line transactions and other information providing services, which are provided by a service provider 30, via a computer network.

A detailed view of an operation sequence for enabling a client 50 to utilize on-line transactions and other information providing services, which are provided by a service provider 30, via a computer network 90 in the information providing system 10 shown in FIG. 1 is shown in FIG. 2. By lying between the information processing center 70, the service provider 30 accesses the IC card 52 held by the client 50 using a secure communication path, and is capable of processing authentication and fees etc. in a secure manner.

The service provider 30 and the information processing center 70 are connected using secure communication via the computer network. Further, the information processing center 70 and the client 50 are connected by card encryption and SSL (Secure Socket Layer) encrypted communication via the computer network 90. Moreover, the client 50 is connected to the IC card 52 by utilizing an electromagnetic induction action via the card reader/writer device 51 connected to a USB. Still further, the service provider 30 and client 50 are network-connected according to HTTP protocol by utilizing an information search system such as the WWW etc.

Before the service provider 30 starts information providing services directed towards the client 50, pre-registration with respect to the information processing center 70 in order to access cards is carried out. With respect to this, the information processing center 70 replies with registration results.

At the client 50, for example, a WWW browser is started up, and it is possible to search WWW information space on the computer network 90. A site of the WWW server 31 administered by the service provider 30 is then accessed, and a merchandise list request is issued in HTTP request format. On the side of the WWW server 31, in response to this request, HTML content displaying a merchandise list is returned in an HTTP response format.

Various merchandise can then be selected via a WWW browser screen (not shown in the drawings) displaying the merchandise list on the side of the client 50. When merchandise it is wished to purchase is decided, a "purchase button" prepared within the browser screen is pressed down. As a result, a merchandise purchase request is sent to the service provider side in HTTP request format.

The client 50 then carries out settlements and point services accompanying purchasing of merchandise using the IC card 52. When the service provider 30 receives a purchase request from the client 50, settlement processing and point service processing with respect to the IC card 52 is entrusted to the information processing center 70. To this end, the service provider 30 first downloads a JAVA applet for carrying out processing for connecting the client 50 to the information processing center 70.

The client 50 then activates a JAVA applet, and establishes a connection to the information processing center 70 in HTTP request format.

After this, the service provider 30 instructs verification of the IC card 52 to the information processing center 70. In response to this, the information processing center 70 issues a polling command for carrying out verification of the IC card 52 using a HTTP response format and awaits a polling response from the IC card 52. When a polling response is received, a card verification reply is sent to the service provider 30.

Next, the service provider 30 instructs authentication of the IC card 52 to the information processing center 70. In response to this, the information processing center 70 issues an authentication (Authentication) command for the IC card 52 using a HTTP response format and awaits an authentication (Authentication) response from the IC card 52. When an authentication response is received in a HTTP request format from the client 50, an authentication reply is sent to the service provider 30.

After a similar authentication procedure is repeated an appropriate number of times, an operation of accessing the IC card 52 for the fee settlement and point service of the merchandise purchase commences. Namely, when a read instruction is issued to the IC card 52 by the service provider 30, the information processing center 70 issues a read (Read) command for the IC card 52 using a HTTP response format and a read (Read) response from the IC card 52 is awaited. When a read response is received in a HTTP request format from the client 50, a card read reply is sent to the service provider 30.

Further, when a write instruction is issued to the IC card 52 by the service provider 30, the information processing center 70 issues a write (Write) command for the IC card 52 using a HTTP response format and a write (Write) response from the IC card 52 is awaited. When a write response is received in a HTTP request format from the client 50, a card read reply is sent to the service provider 30. The operation of reading/writing to the IC card 52 is repeatedly executed by just the number of times necessary.

In this way, when settlement processing and point service processing utilizing the IC card 52 is complete, the service provider 30 notifies the information processing center 70 to the effect that processing is complete, and the information processing center 70 notifies the client 50 that processing is complete using a HTTP response format.

When processing is complete for the IC card 52, the client 50 issues a request to display processing results for the IC card 52 to the service provider 30, and the service provider 30 returns displayed results. As a result, the browser screen of the client 50 is switched over.

Figure 3:
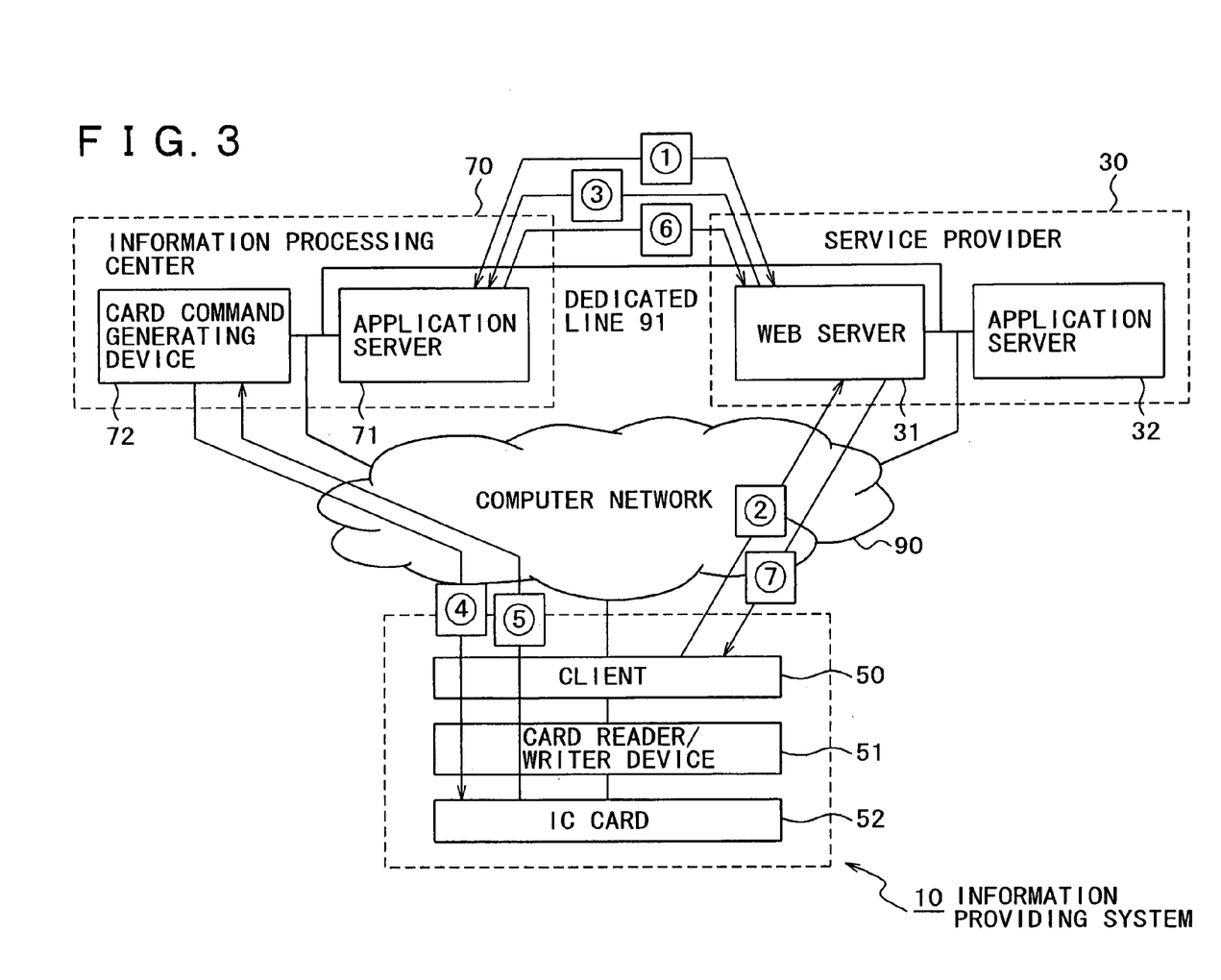
FIG. 3 is a view showing a modified example of an information providing system 10.

A view of a modified example of the information providing system 10 is shown in FIG. 3. In the example shown in the same drawing, in order to further increase security between the service provider 30 and the information processing center 70, communication between both parties is carried out through connection by a dedicated line 91 rather than by using the computer network 90. In this case, communication such as procedures such as pre-registration and registration result replying etc. for the information processing center 70 of the service provider 30 and accessing of the card etc. are all carried out via the dedicated line 91.

This information providing system 10 shown in FIG. 3 executes an on-line purchasing procedure for between the client 50 and the service provider 30 using the processing procedure shown below.

① A key is handed over beforehand between the service provider 30 and the information processing center 70

② Trigger occurring at the client 50 (example, pressing of a purchase button on a browser screen)

③ Instruction from the service provider 30 to the information processing center 70

④ Issuing of command from the information processing center 70 to the IC card 52

⑤ Response from the IC card 52 to the information processing center 70

⑥ Reply to instruction from the information processing center 70 to the service provider 30

⑦ Response to trigger from the service provider 30 to the client 50

However, the processing of ①, ③, and ⑥ is carried out not via the computer network 90 but via the dedicated line 91.

Figure 4:
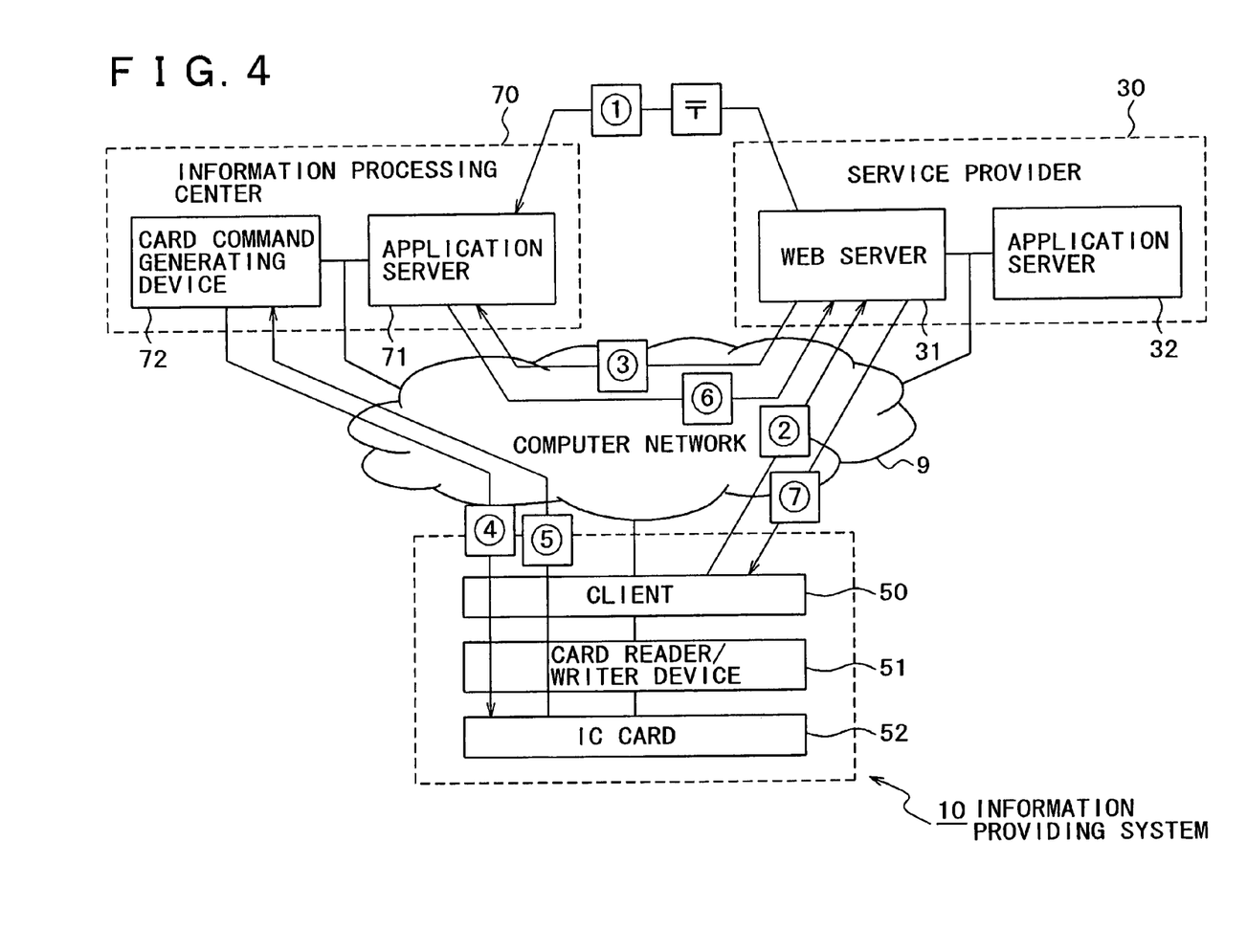
FIG. 4 is a view showing a modified example of an information providing system 10.

Further, a still further view of a modified example of the information providing system 10 is shown in FIG. 4. In the example in the same drawing, in order to further increase security between the service provider 30 and the information processing center 70, means not utilizing transmission and receiving of data signals in real time such as post etc. are utilized in the exchange of data of the utmost importance such as pre-registration and returning of registration results etc. for the information processing center 70 of the service provider 30.

This information providing system 10 shown in FIG. 4 executes an on-line purchasing procedure for between the client 50 and the service provider 30 using the processing procedure shown below.

① A key is handed over beforehand between the service provider 30 and the information processing center 70

② Trigger occurring at the client 50 (example, pressing of a purchase button on a browser screen)

③ Instruction from the service provider 30 to the information processing center 70

④ Issuing of command from the information processing center 70 to the IC card 52

⑤ Response from the IC card 52 to the information processing center 70

⑥ Reply to instruction from the information processing center 70 to the service provider 30

⑦ Response to trigger from the service provider 30 to the client 50

However, processing for handing over a key in advance ① is carried out via physical distribution in real space such as by post etc. rather than by using the computer network 90.

Figure 5:
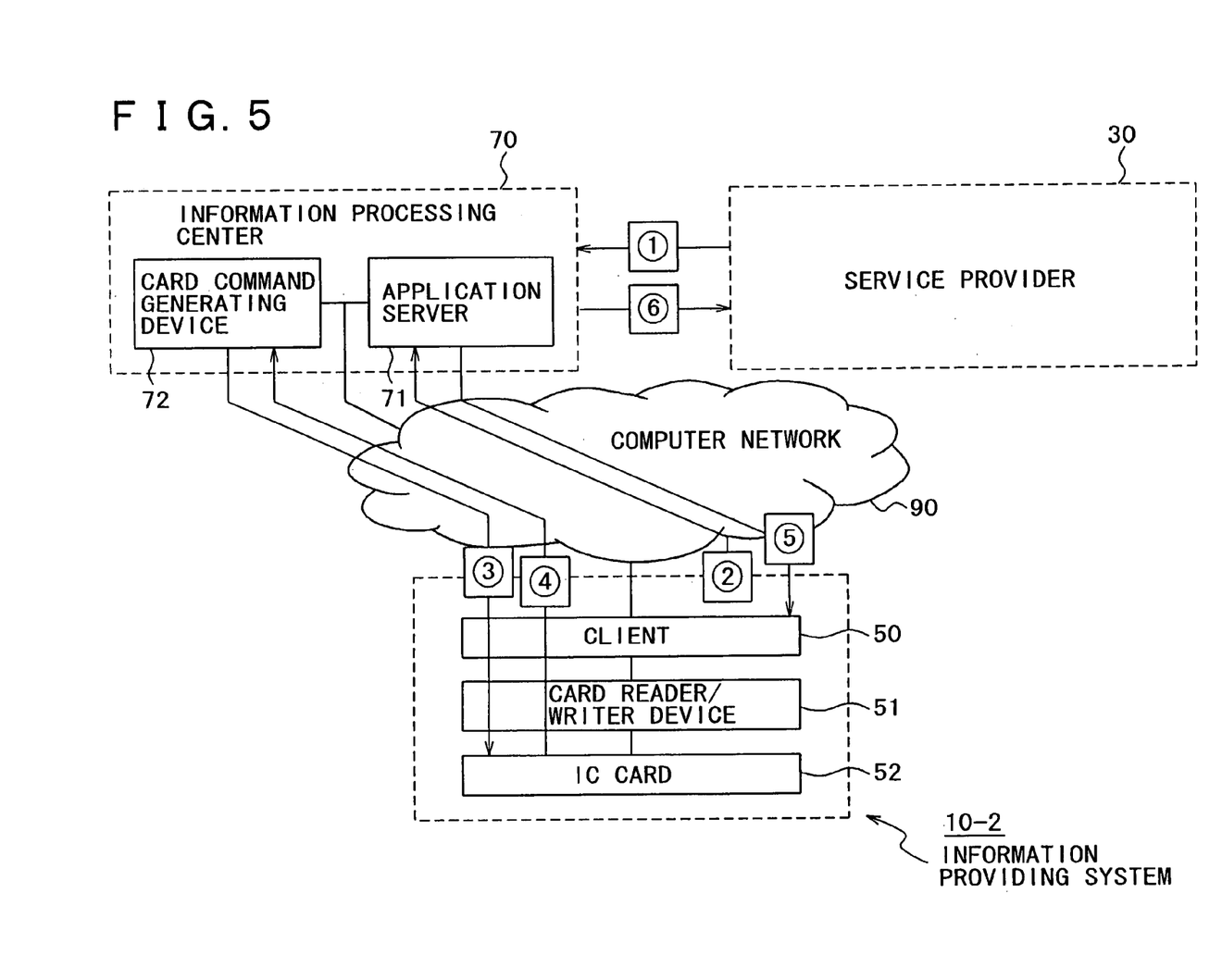
FIG. 5 is a view schematically showing an application example of an information providing system 10-2 of a second embodiment of the present invention.

An application example of an information providing system 10-2 of a second embodiment of the present invention is shown in FIG. 5.

This information providing system 10-2 is configured from a service provider 30 for carrying out information services, a client 50 requesting services from the service provider 30, and an information processing center 70 for communicating with an IC card 52 installed on the side of the client 50 via a network 90. In order to keep the drawings simple, only one of each service provider and client is depicted but it is also possible for a limitless number of providers and clients to exist on the network 90.

In this embodiment, the service provider 30 is not particularly prepared with any installation for carrying out exchange of data via the computer network 90, and not just accessing to the IC card 52 on the side of the client 50, but also all routine operations starting with information providing services for the WWW etc. are entrusted to the information processing center 70. The information processing center 70 is also mounted with a WWW server 73 in addition to the card command generating device 72 and the application server 71.

The kind of network operation shown below is executed by the information providing system 10-2 shown in FIG. 5.

(1) The service provider 30 registers a program list describing processing content for the IC card 52 in advance with the information processing center 70.

(2) When there is an access to the information processing center 70 from the client 50 installed at home or in an office, etc., the information processing center executes the program list describing processing content for the IC card 52 registered in advance, and a determination is made as to whether or not this is an IC card that is a subject of program execution. If this is a subjected card, encrypted card commands that can be interpreted by the IC card itself are issued in accordance with the description in the program list and these are sent to the IC card 52 via the computer network 90, client 50, and card reader/writer device 52.

(3) The IC card 52 translates card commands for which encryption is complete received from the information processing center 70, carries out processing within the card, and sends responses (processing results) for the encrypted card commands to the information processing center 70 via the card reader/writer device 51, client 50, and computer network 90.

(4) The information processing center 70 deciphers responses for which encryption is complete received from the IC card 52 and carries out the following processing with these results in accordance with the description of the program list.

(5) At a stage where the series of processes are complete for the IC card 52, the information processing center 70 notifies the client 50 of this.

(6) The information processing center 70 sends a processing report to the service provider 30 periodically within a fixed period of time.

In this embodiment, the service provider 30 entrusts not only the function of accessing the IC card but also all service execution for the client 50 such as WWW site administration etc. to the information processing center 70. The service provider 30 is therefore released from the substantial amount of trouble and cost involved in installing and maintaining functions for accessing the IC card. Further, the information processing center 70 is capable of making the information providing services of the WWW server 73 and processing such as for settlement and point services etc. utilized by the card cooperate effectively.

This information providing system 10-2 executes an on-line purchasing procedure by the client 50 using the processing procedure shown below.

① Pre-registration at the information processing center 70 of a program describing processing content defined by the service provider 30

② Access to the information processing center 70 by the client 50

③ Issuing of command from the information processing center 70 to the IC card 52 of the client 50

④ Sending of response from the IC card 52 to the information processing center 70

⑤ Completion notification from the information processing center to the client 50

⑥ Processing report distribution from information processing center 70 to the service provider 30

Figure 6:
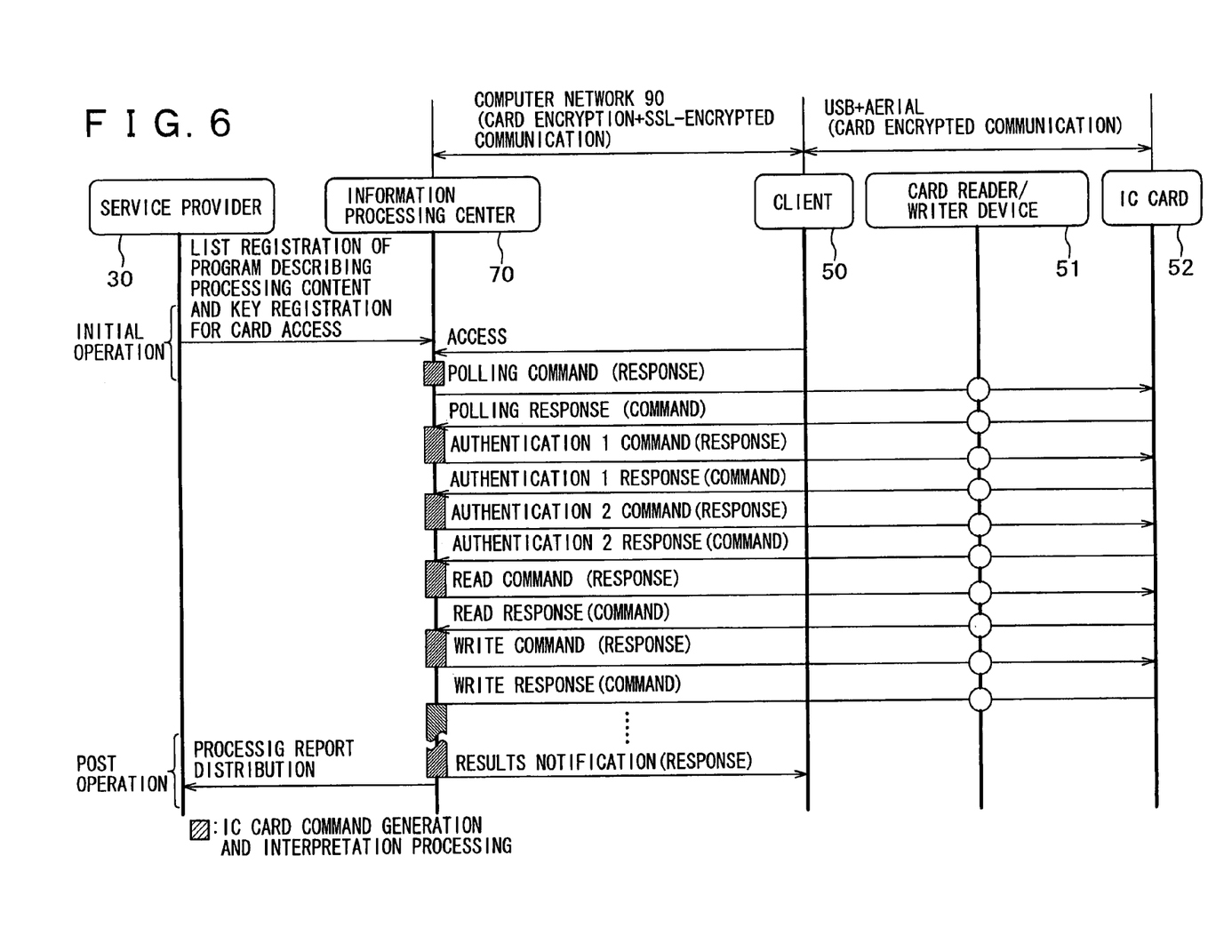
FIG. 6 is a view showing a sequence for enabling a client 50 to utilize on-line transactions and other information providing services, which are provided by a service provider 30, via a computer network.

A detailed view of an operation sequence for enabling a client 50 to utilize on-line transactions and other information providing services, which are provided by a service provider 30, via a computer network 90 in the information providing system 10-2 shown in FIG. 5 is shown in FIG. 6. The service provider 30 entrusts all processing procedures to the information processing center 70 via the computer network 90. The information processing center 70 carries out online procedures for the client 50 and accessing to the IC card 52 in the possession of the client 50 using a secure communication line, and processing for authentication and fees etc. can be carried out in a secure manner.

In this embodiment, the communication path between the service provider 30 and the information processing center 70 is arbitrary and a computer network or any kind of physical distribution in the real world may be adopted providing that guarantee of secure communication is ensured. Further, the information processing center 70 and the client 50 are connected by card encryption and SSL (Secure Socket Layer) encrypted communication via the computer network 90. Moreover, the client 50 is connected to the IC card 52 by utilizing an electromagnetic induction action via the card reader/writer device 51 connected to a USB. Further, the information processing center 70 administers the WWW server 73 on behalf of the service provider 30 and it is therefore not necessary to connect the service provider 30 and the client 50.

The service provider 30 registers program lists describing processing content of services it is wished to administer for the information processing center 70 via the computer network 90 or utilizing physical distribution in real space, and registers keys for card access in advance.

On the client 50, for example, a WWW browser is activated, a WWW information space on the computer network 90 is searched, a site on the WWW server 73 administered by the information processing center 70 is accessed as a result of a request by the service provider 30, and a merchandise list is displayed. When merchandise it is wished to purchase is decided upon, a "purchase button" prepared within the browser screen is pressed down (same as above). As a result, a merchandise purchase request is sent to the WWW server 73 in HTTP request format.

The client 50 then carries out settlements and point services accompanying purchasing of the merchandise using the IC card 52. The service provider 30 entrusts settlement processing and point service processing with respect to the IC card 52 to the information processing center 70. First, the information processing center 70 therefore issues a polling command for carrying out verification of the IC card 52 using a HTTP response format and awaits a polling response from the IC card 52.

The client 50 returns a polling response from the IC card 52 to the information processing center 70 in HTTP request format. Continuing on, the information processing center 70 issues an authentication (Authentication) command for the IC card 52 using a HTTP response format and awaits an authentication (Authentication) response from the IC card 52. The client 50 returns an authentication response from the IC card 52 to the information processing center 70 in HTTP request format. This kind of procedure is repeatedly executed for the IC card 52 by just the number of times necessary.

In this way, when verification and authentication of the IC card 52 are complete, the information processing center 70 starts accessing the IC card 52, and processing of settlements and service points accompanying a product purchase is carried out. Namely, the information processing center 70 issues a read (Read) command for the IC card 52 using a HTTP response format and awaits a read (Read) response from the IC card 52. When a read response in HTTP request format is received from the client 50, a write (Write) command for the IC card 52 is issued in HTTP response format, and a write (Write) response from the IC card 52 is awaited. The operation of reading/writing to the IC card 52 is repeatedly executed by just the number of times necessary.

In this way, when settlement processing and point service processing utilizing the IC card 52 is complete, the information processing center 70 notifies the service provider 30 to the effect that processing is complete, and notifies the client 50 that processing is complete using a HTTP response format.

The information processing center 70 sends a processing report to the service provider 30 periodically within a fixed period of time. Transmission of the processing report may be carried out via the computer network 90 or by utilizing physical distribution in the real world using post etc.

Figure 7:
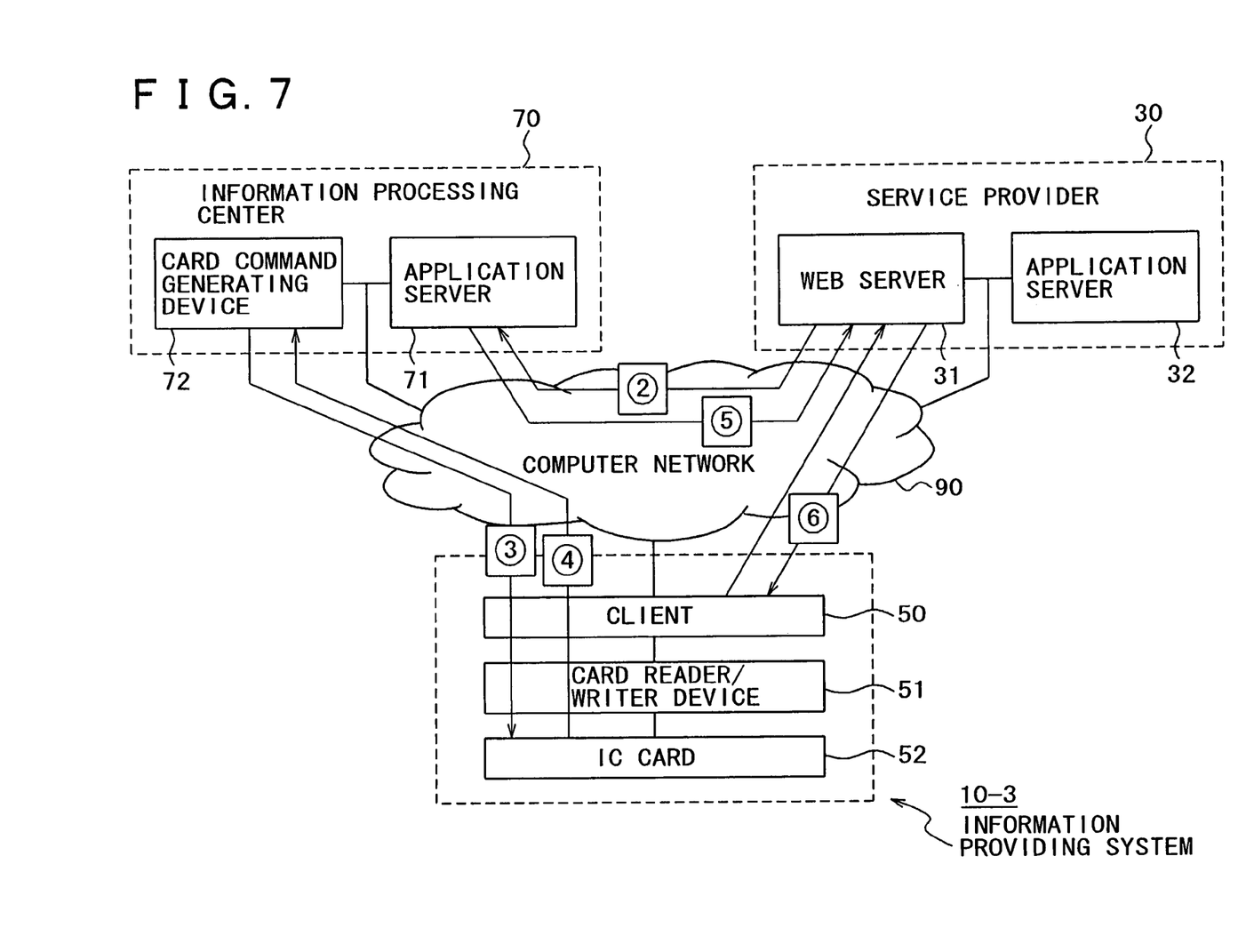
FIG. 7 is a view schematically showing an application example of an information providing system 10-3 of a third embodiment of the present invention.

An application example of an information providing system 10-3 of a third embodiment of the present invention is shown in FIG. 7.

This information providing system 10-3 is configured from a service provider 30 for carrying out information services, a client 50 requesting services from the service provider 30, and an information processing center 70 for communicating with an IC card 52 installed on the side of the client 50 via a network 90. In order to keep the drawings simple, only one of each service provider and client is depicted but it may be also possible for a limitless number of providers and clients to exist on the network 90.

In this embodiment, the service provider 30 instructs the information processing center 70 collectively of a series of procedures such as fees and point services etc. for the IC card 52. The information processing center 70 in this case responds to procedure requests from the service provider 30, executes authentication of the IC card 52 and a series of read/write operations, and returns only these results to the service provider 30.

The kind of network operation shown below is executed by the information providing system 10-3 shown in FIG. 7.

(1) The service provider 30 requests instructions that are limited to specific services of accesses to the IC card 52 such as fee settlement and point services (for example, adding 1000 points) for the information processing center 70. During this time, communication is carried out between the service provider 30 and the information processing center 70 in a state guaranteeing security including the use of a key when reading and writing to and from the IC card 52.

(2) The information processing center 70 issues encrypted card commands that can be interpreted by the IC card 52 itself based on requests received from the service provider 30 and sends these to the IC card 53 via the computer network 90, client 50, and card reader/writer device 51.

(3) The IC card 52 translates card commands for which encryption is complete received from the information processing center 70, carries out processing within the card, and sends responses (processing results) for the encrypted card commands to the information processing center 70 via the card reader/writer device 51, client 50, and computer network 90.

(4) The information processing center 70 deciphers encrypted responses received from the IC card 52 and repeatedly executes processing from (2) above until the end of completion of instructions received from the service provider 30.

(5) When instructions received from the service provider 30 are complete, the information processing center 70 notifies the service provider 30 of this.

This information providing system 10-3 executes an on-line purchasing procedure by the client 50 using the processing procedure shown below.

① Trigger to the service provider 30 occurring at the client 50 (example, pressing of a purchase button on a browser screen)

② Instruction from the service provider 30 to the information processing center 70

③ Issuing of command from the information processing center 70 to the IC card 52

④ Response from the IC card 52 to the information processing center 70

⑤ Reply to instruction from the information processing center 70 to the service provider 30

⑥ Response to trigger from the service provider 30 to the client 50

Figure 8:
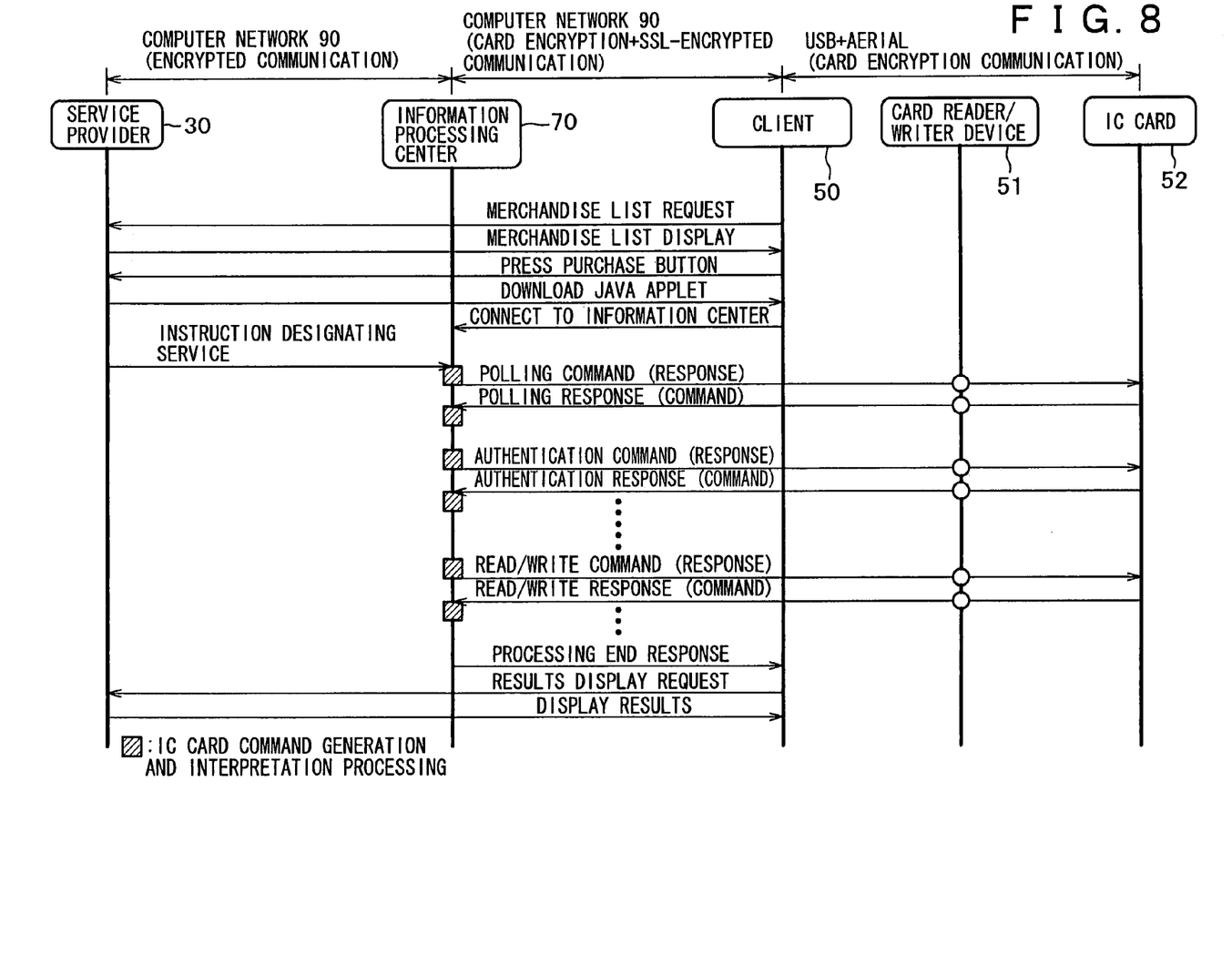
FIG. 8 is a view showing a sequence for enabling a client 50 to utilize on-line transactions and other information providing services, which are provided by a service provider 30, via a computer network.

A detailed view of an operation sequence for enabling a client 50 to utilize on-line transactions and other information providing services, which are provided by a service provider 30, via a computer network 90 in the information providing system 10-3 shown in FIG. 7 is shown in FIG. 8. The service provider 30 collectively entrusts processing procedures for the IC card 52 on the side of the client 50 to the information processing center 70, and the information processing center 70 returns only results of access operations to the IC card 52 to the service provider 30.

The service provider 30 and the information processing center 70 are connected using secure communication via the computer network. Further, the information processing center 70 and the client 50 are connected by card encryption and SSL (Secure Socket Layer) encrypted communication via the computer network 90. Moreover, the client 50 is connected to the IC card 52 by utilizing an electromagnetic induction action via the card reader/writer device 51 connected to a USB. Still further, the service provider 30 and client 50 are network-connected according to HTTP protocol by utilizing an information search system such as the WWW etc.

At the client 50, for example, a WWW browser is started up, and it is possible to search WWW information space on the computer network 90. A site of the WWW server 31 administered by the service provider 30 is then accessed, and a merchandise list request is issued in HTTP request format. On the side of the WWW server 31, in response to this request, HTML content displaying a merchandise list is returned in an HTTP response format.

Various merchandise can then be selected via a WWW browser screen (not shown in the drawings) displaying the merchandise list on the side of the client 50. When merchandise it is wished to purchase is decided, a "purchase button" prepared within the browser screen is pressed down. As a result, a merchandise purchase request is sent to the service provider side in HTTP request format.

The client 50 then carries out settlements and point services accompanying purchasing of the merchandise using the IC card 52. When the service provider 30 receives a purchase request from the client 50, settlement processing and point service processing with respect to the IC card 52 is entrusted to the information processing center 70. To this end, the service provider 30 first downloads a JAVA applet for carrying out processing for connecting the client 50 to the information processing center 70.

The client 50 then activates a JAVA applet, and establishes a connection to the information processing center 70 in HTTP request format.

After this, the service provider 30 instructs the execution of specific services utilized by the IC card 52 such as processing of electronic settlement and service points etc. to the information processing center 70.

In response to this, the information processing center 70 issues a polling command for carrying out verification of the IC card 52 using a HTTP response format and awaits a polling response from the IC card 52. When a polling response is received, a card verification reply is sent to the service provider 30.

The client 50 returns a polling response from the IC card 52 to the information processing center 70 in HTTP request format. Continuing on, the information processing center 70 issues an authentication (Authentication) command for the IC card 52 using a HTTP response format and awaits an authentication (Authentication) response from the IC card 52. The client 50 returns the authentication response from the IC card 52 to the information processing center 70 in HTTP request format. This kind of procedure is repeatedly executed for the IC card 52 by just the number of times necessary.

In this way, when verification and authentication of the IC card 52 are complete, the information processing center 70 starts accessing the IC card 52, and processing of settlements and service points accompanying a product purchase is carried out. Namely, the information processing center 70 issues a read (Read) command for the IC card 52 using a HTTP response format and awaits a read (Read) response from the IC card 52. When a read response in HTTP request format is received from the client 50, a write (Write) command for the IC card 52 is issued in HTTP response format, and a write (Write) response from the IC card 52 is awaited. The operation of reading/writing to the IC card 52 is repeatedly executed by just the number of times necessary.

In this way, when execution of specific instructed services such as settlement processing and point service processing utilizing the IC card 52 is complete, the information processing center 70 notifies the service provider 30 to the effect that processing is complete, and notifies the client 50 that processing is complete using a HTTP response format.

When processing is complete for the IC card 52, the client 50 issues a request to display processing results for the IC card 52 to the service provider 30, and the service provider 30 returns displayed results. As a result, the browser screen of the client 50 is switched over.

Supplement

In the above, a detailed description of the present invention is given with reference to specific embodiments. However, it is evident that one skilled in the art may come up with variations and substitutions of the aforementioned embodiments without deviating from the scope of the present invention. Namely, the present invention as disclosed above is merely cited as an example, and should by no means be interpreted as limiting the content disclosed in this specification. The essence of the present invention is to be discerned while taking into consideration the patent claims as laid out at the beginning.

INDUSTRIAL APPLICABILITY

According to the present invention, there is provided a superior access control method and computer program for information providing systems and authentication media capable of carrying out processing such as authentication procedures and electronic settlement using secure communication via a wide area network.

Further, according to the present invention, there is provided a superior access control method and computer program for information providing systems and authentication media capable of appropriately providing services via a wide area network to a client to which an IC card holding value information and authentication information is connected.

Moreover, according to the present invention, there is provided a superior access control method and computer program for information providing systems and authentication media capable of accessing an IC card connected to a client using secure communication.

According to the present invention, a service provider providing information using a computer network entrusts administration of accessing an IC card to an external information processing center. The service provider is therefore freed from the substantial amount of trouble and cost involved in installing and maintaining functions for accessing IC cards when carrying out online transactions utilizing an IC card.

For example, processing of fee settlement and service points utilizing an IC card can easily be implemented via a computer network for a client who purchases merchandise.

Further, a service provider can develop business utilizing IC cards without knowledge or skill relating to IC cards.

The invention claimed is:

1. An information providing system for providing information to a client in possession of an authentication medium capable of being accessed using key information via a communication medium, comprising:
an information providing device configured (1) to perform information providing services for said client via said communication medium, (2) to make requests to an authentication medium access device for processing of the authentication medium in command units, wherein said authentication medium access device is within a information processing center, and (3) to issue commands for said client to the authentication medium access device and receive decrypted client responses from the authentication medium access device;
the authentication medium access device configured to execute accessing processing accompanying information providing services for said authentication medium possessed by said client via said communication medium in response to information providing services performed by said information providing device, to encrypt said commands received from said information providing device and send encrypted commands to the client, and to decrypt encrypted responses received from said client and send the decrypted responses to said information providing device; and
a connection device configured to hand over key information for accessing said authentication medium in advance between said information providing device and said authentication medium access device, wherein the key information are registered for accessing the authentication medium in advance.

2. The information providing system as disclosed in claim 1, wherein said authentication medium access device carries out verification of said authentication medium, authentication processing for said authentication medium, and/or read and write processing of electronic data stored in said authentication medium.

3. The information providing system as disclosed in claim 1, wherein said connection device includes a secure communication path on said communication medium.

4. The information providing system as disclosed in claim 1, wherein said connection device includes a dedicated line.

5. The information providing system as disclosed in claim 1, wherein said authentication medium access device carries out access operations to said authentication medium in response to requests from said information providing device and sequentially returns access results to said information providing device.

6. The information providing system as disclosed in claim 1, wherein said authentication medium access device carries out verification of said authentication medium, authentication processing for said authentication medium and/or read and write processing of electronic data stored in said authentication medium, in response to requests from said information providing device, and returns results of a series of access processes for said authentication medium to said information providing device.

7. The information providing system as disclosed in claim 1, wherein the communication medium is a wide area network.

8. The information providing system as disclosed in claim 1, wherein the authentication medium access device encrypts commands using a secure socket layer (SSL) protocol.

9. A method for an authentication medium access device to control access to an authentication medium capable of being accessed using key information via a communication medium, comprising:
receiving key information for accessing said authentication medium in advance from an information providing device, wherein the key information are registered for accessing the authentication medium in advance;
receiving requests from the information providing device for processing of the authentication medium in command units, wherein said authentication medium access device is within a information processing center, and receiving commands for a client from the information providing device and sending decrypted client responses to the information providing device; and
executing accessing processing accompanying information providing services for said authentication medium possessed by a client via said communication medium in response to information providing services carried out by said information providing device for said client via said communication medium, said executing including encrypting commands received from said information providing device and sending encrypted commands to the client via the communication medium, and decrypting encrypted responses received from said client via the communication medium and sending the decrypted responses to said information providing device.

10. The method for controlling access to an authentication medium as disclosed in claim 9, wherein verification of said authentication medium, authentication processing for said authentication medium, and/or read and write processing of electronic data stored in said authentication medium are carried out in said executing.

11. The method for controlling access to an authentication medium as disclosed in claim 9, wherein said receiving is executed utilizing a secure communication path established on said communication medium.

12. The method for controlling access to an authentication medium as disclosed in claim 9, wherein said receiving is executed on a dedicated line.

13. The method for controlling access to an authentication medium as disclosed in claim 9, wherein access operations to said authentication medium is carried out in response to requests from said information providing device and access results are sequentially returned to said information providing device in said executing.

14. The method for controlling access to an authentication medium as disclosed in claim 9, wherein verification of said authentication medium, authentication processing for said authentication medium and/or read and write processing of electronic data stored in said authentication medium are carried out in response to requests from said information providing device, and results of a series of access processes for said authentication medium are reported to said information providing device in said executing.

15. A computer readable storage medium including computer executable instructions, wherein the instructions, when executed by a processor, cause the processor to perform a method for an authentication medium access device executing control of accessing an authentication medium accessible using an information key via a communication medium on a computer system, the method comprising:

receiving key information for accessing said authentication medium in advance from an information providing device, wherein the key information are registered for accessing the authentication medium in advance;

receiving requests from the information providing device for processing of the authentication medium in command units, wherein said authentication medium access device is within a information processing center, and receiving commands for a client from the information providing device and sending decrypted client responses to the information providing device; and executing accessing processing accompanying information providing services for said authentication medium possessed by a client via said communication medium in response to information providing services carried out by said information providing device for said client via said communication medium, said executing including encrypting commands received from said information providing device and sending encrypted commands to the client via the communication medium, and decrypting encrypted responses received from said client via the communication medium and sending the decrypted responses to said information providing device.

* * * * *